US012753858B2

(12) United States Patent
Deneuve et al.

(10) Patent No.: US 12,753,858 B2
(45) Date of Patent: Oct. 6, 2026

(54) MONITORING AN ANTI-LEAK VALVE IN A JET ENGINE

(71) Applicant: SAFRAN AIRCRAFT ENGINES, Paris (FR)

(72) Inventors: Sébastien Jean Fernand Deneuve, Moissy-Cramayel (FR); Alrick Patrick Michel Jacques Verrier, Moissy-Cramayel (FR); Matthieu Louis Joseph Ricadat-Crosnier, Moissy-Cramayel (FR); Clémentine Morisot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 467 days.

(21) Appl. No.: 18/551,123

(22) PCT Filed: Mar. 18, 2022

(86) PCT No.: PCT/FR2022/050499
§ 371 (c)(1),
(2) Date: Sep. 18, 2023

(87) PCT Pub. No.: WO2022/195234
PCT Pub. Date: Sep. 22, 2022

(65) Prior Publication Data

US 2024/0159328 A1 May 16, 2024

(30) Foreign Application Priority Data

Mar. 19, 2021 (FR) ...................................... 2102799

(51) Int. Cl.

| | |
|---|---|
| ***G06F 11/30*** | (2006.01) |
| ***B64F 5/60*** | (2017.01) |
| ***F16K 37/00*** | (2006.01) |
| *B64D 27/16* | (2006.01) |

(52) U.S. Cl.
CPC ............ *F16K 37/0091* (2013.01); *B64F 5/60* (2017.01); *B64D 27/16* (2013.01)

(58) Field of Classification Search
CPC .................................................. F16K 37/0091
See application file for complete search history.

(56) References Cited

U.S. PATENT DOCUMENTS

| | | | |
|---|---|---|---|
| 2012/0130617 | A1 | 5/2012 | Raimarckers et al. |
| 2013/0218399 | A1 | 8/2013 | Demaison et al. |
| 2019/0226358 | A1 | 7/2019 | Beier et al. |

FOREIGN PATENT DOCUMENTS

| | | | |
|---|---|---|---|
| EP | 2458161 | A1 | 5/2012 |
| EP | 2829698 | A1 | 1/2015 |
| FR | 2958911 | A1 | 10/2011 |

OTHER PUBLICATIONS

International Search Report for PCT/FR2022/050499 dated Jun. 7, 2022.

*Primary Examiner* — Phuong Huynh
(74) *Attorney, Agent, or Firm* — McDonald Hopkins LLC

(57) ABSTRACT

Method for monitoring an anti-leak valve of a circuit for supplying oil between an oil reservoir and elements to be lubricated of a jet engine, comprising steps of: measuring oil level values in the reservoir, at the beginning and at the end of starting the jet engine; calculating the difference between the measured oil levels, to form a measured change in the oil level; measuring an oil temperature value; determining an estimated change of the oil level in the reservoir, depending on the oil temperature; calculating the difference between the measured change and the estimated change in the oil level for the measured temperature; comparing the calculated difference with a detection threshold; and activating an alarm depending on the result of the comparison.

7 Claims, 4 Drawing Sheets

MONITORING AN ANTI-LEAK VALVE IN A JET ENGINE

This is the National Stage of PCT international application PCT/FR2022/050499, filed on Mar. 18, 2022 entitled “MONITORING AN ANTI-LEAK VALVE IN A JET ENGINE”. which claims the priority of French Patent Application No. 2102799 filed Mar. 19, 2021, both of which are incorporated herein by reference in their entireties.

TECHNICAL FIELD

The present invention generally relates to the system for lubricating a jet engine. More particularly, it relates to monitoring an anti-leak valve of a circuit for supplying oil between an oil reservoir and elements to be lubricated of a jet engine.

PRIOR ART

A jet engine comprises a lubrication system, mounted directly on the accessory gearbox (AGB) of the jet engine. The lubrication system comprises an oil reservoir, an oil supply circuit for distributing oil to the components of the jet engine to be lubricated and an oil recovery circuit to ensure the return of oil to the reservoir. A set of pumps, actuators and sensors enable oil to circulate from the reservoir to the components of the jet engine to be lubricated via the supply circuit and inversely from the jet engine to the reservoir via the recovery circuit.

The two main functions of the lubrication system are on the one hand to lubricate and cool the components of the jet engine and on the other hand to maintain the temperature of the oil at an acceptable level. The overall monitoring of the lubrication system is carried out by regulation software that acquires data from an oil temperature and pressure sensor placed at the accessory gearbox and an oil level sensor placed in the oil reservoir.

The circuit for supplying oil between the oil reservoir and the components of the jet engine to be lubricated comprises an Anti-Leak Valve (ALV). The anti-leak valve is of the on-off type: it opens depending on the operating conditions and it is not controlled by the calculator of the jet engine. The purpose of the anti-leak valve is to prevent the oil present in the reservoir from draining by gravity into the accessory gearbox of the jet engine, when the jet engine is stopped.

In the event of malfunction of the anti-leak valve, it no longer fulfils its function, which may have a negative impact on the jet engine.

Indeed, the various pumps of the supply and recovery circuits of the lubrication system do not operate when the jet engine is stopped and without the anti-leak valve, the oil drains from the oil reservoir to the accessory gearbox of the jet engine. This poses problems, in particular a risk that the empty reservoir is not filled with oil during a maintenance operation, which would have the consequence of leading to an overflow of oil in the jet engine. However, an overflow of oil produces detrimental effects for the jet engine.

Therefore, there is a need to monitor the anti-leak valve of the circuit for supplying oil between the oil reservoir and the elements to be lubricated of the jet engine, to be able to detect a failure of the anti-leak valve.

DISCLOSURE OF THE INVENTION

The aim of the invention is to solve the problems of the prior art by providing a method for monitoring an anti-leak valve of a circuit for supplying oil between an oil reservoir and elements to be lubricated of a jet engine, characterised in that it comprises steps of:

- Command to measure oil level values in the reservoir, respectively at the beginning and at the end of starting the jet engine,
- Calculating the difference between the oil level values in the reservoir at the beginning and at the end of starting the jet engine, to form a measured change in the oil level in the reservoir,
- Command to measure an oil temperature value,
- Determining an estimated change of the oil level in the reservoir, depending on the oil temperature value,
- Calculating the difference between the measured change in the oil level in the reservoir and the estimated change of the oil level in the reservoir for the measured temperature value,
- Comparing the calculated difference with a detection threshold,
- Activating an alarm if the calculated difference is lower than the detection threshold.

Thanks to the invention, it is possible to monitor the anti-leak valve of the circuit for supplying oil between the oil reservoir and the elements to be lubricated of the jet engine without installing a position sensor on the anti-leak valve. Such a sensor would have an impact on the weight, the cost and the complexity of the product.

The invention also avoids preventive maintenance operations for ensuring the correct operation of the anti-leak valve, which would significantly increase the maintenance constraints and which do not form part of a possible operational solution.

According to a preferred feature, the beginning and the end of starting the jet engine are detected on the basis of measuring the speed of a high pressure shaft of the jet engine.

According to a preferred feature, the alarm is activated if the result of the comparison is lower than the detection threshold for a first predetermined number of startings of the jet engine from a second predetermined number of recent startings of the jet engine.

The invention also relates to a device for monitoring an anti-leak valve of a circuit for supplying oil between an oil reservoir and elements to be lubricated of a jet engine, characterised in that it comprises:

- A sensor capable of measuring oil level values in the reservoir, respectively at the beginning and at the end of starting the jet engine,
- A sensor capable of measuring an oil temperature value,
- A calculator capable of calculating the difference between the oil level values in the reservoir at the beginning and at the end of starting the jet engine, to form a measured change in the oil level in the reservoir, determining an estimated change of the oil level in the reservoir depending on the oil temperature value, calculating the difference between the measured change in the oil level in the reservoir and the estimated change of the oil level in the reservoir for the measured temperature value, comparing the difference calculated with a detection threshold, and activating an alarm if the calculated difference is lower than the detection threshold.

The invention also relates to a jet engine equipped with a device for monitoring an anti-leak valve of a circuit for supplying oil between an oil reservoir and elements to be lubricated of the jet engine, such as previously presented.

The invention also relates to an aircraft equipped with a jet engine such as previously presented.

The device, the jet engine and the aircraft have advantages similar to those previously presented.

In a particular embodiment, the steps of the method according to the invention are implemented by computer program instructions.

Consequently, another aim of the invention is a computer program on an information medium, this program being likely to be implemented in a computer, this program comprising instructions adapted to the implementation of steps of a method such as described above.

Another aim of the invention is an information medium that can be read by a computer, and comprising computer program instructions adapted to the implementation of steps of a method such as described above.

BRIEF DESCRIPTION OF THE DRAWINGS

Other features and advantages will become apparent upon reading the following description of a preferred embodiment given by way of a non-limiting example, described with reference to the drawings wherein.

Identical, similar or equivalent parts of the various figures bear the same numerical references so as to facilitate the transition from one figure to the other.

The various parts represented in the figures are not necessarily according to a uniform scale, in order to make the figures more readable.

The various options (alternative embodiments and embodiments) should be understood as not being mutually exclusive and can be combined with one another.

DETAILED DISCLOSURE OF PARTICULAR EMBODIMENTS

Figure 1:
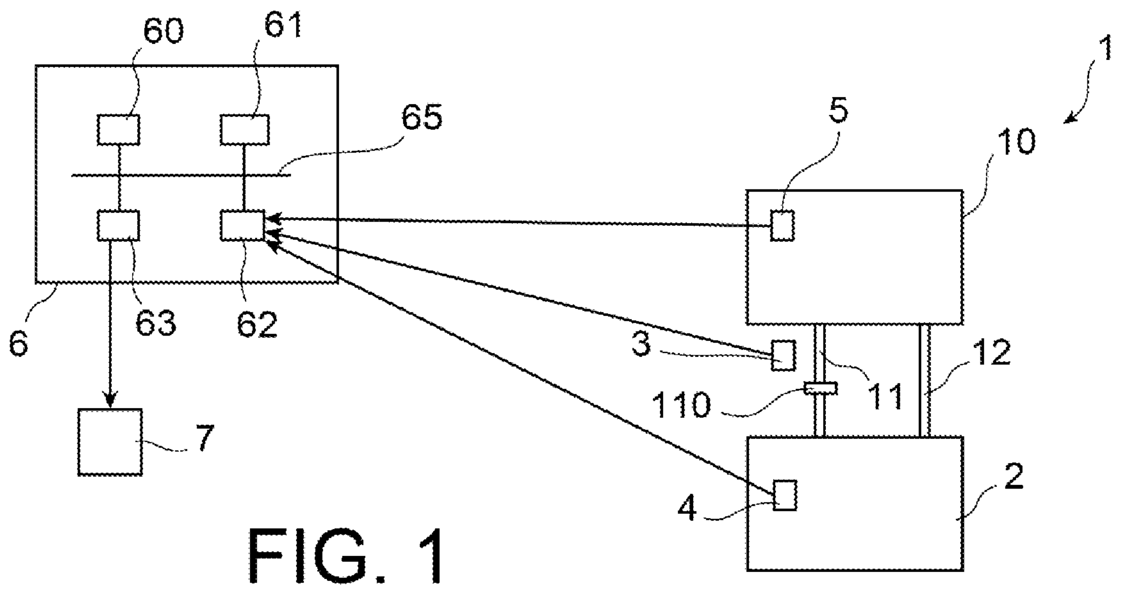
FIG. 1 illustrates a jet engine equipped with a circuit for monitoring the anti-leak valve of the circuit for supplying the lubrication system, according to one embodiment of the invention.

According to a preferred embodiment, represented in FIG. 1, a jet engine comprises a system 1 for lubricating an assembly 2 of components of the jet engine to be lubricated.

The lubrication system comprises an oil reservoir 10, an oil supply circuit 11 for distributing oil to the components of the jet engine to be lubricated and an oil recovery circuit 12 to ensure the return of oil to the reservoir. The jet engine also comprises an accessory gearbox not represented.

More particularly interest is taken in an anti-leak valve (ALV) 110 of the oil supply circuit 11, disposed between the reservoir 10 and the assembly 2 of components to be lubricated.

The anti-leak valve is of the on-off type. The purpose of the anti-leak valve is to prevent the oil present in the reservoir from draining by gravity into the accessory gearbox of the jet engine, when the jet engine is stopped.

The jet engine comprises sensors, in particular an oil temperature sensor 3 placed in the accessory gearbox, a high pressure shaft speed sensor 4 of the jet engine and an oil level sensor 5 placed in the oil reservoir 10.

Only the elements useful for understanding the invention are described, and the other elements of the jet engine and of its lubrication system are known by the person skilled in the art and will not be detailed here.

The jet engine comprises a circuit 6 for monitoring the anti-leak valve 110 of the oil supply circuit. The circuit for monitoring the anti-leak valve may be a dedicated calculator or a subassembly of a calculator that performs an overall monitoring of the oil circuit via regulation software that receives data from sensors.

The monitoring circuit 6 has the general structure of a computer. In particular, it comprises a processor 60 executing a computer program implementing the method according to the invention, a memory 61, an input interface 62 and an output interface 63.

These various elements are conventionally connected by a bus 65.

The input interface 62 is connected to respective outputs of the sensors 3, 4 and 5 and is intended to receive the variables measured by these sensors.

The processor 60 executes the processing disclosed in the following. This processing is performed in the form of code instructions from the computer program that are stored by the memory 61 before being executed by the processor 60.

The memory 61 stores the measured values and the calculated values.

The output interface 63 is connected to an alarm system 7, integrated or not into the monitoring circuit 6 and that is activated depending on the result of the monitoring. The alarm system 7 is conventional and comprises an interface for an operator to deliver an alarm to them.

Figure 2:
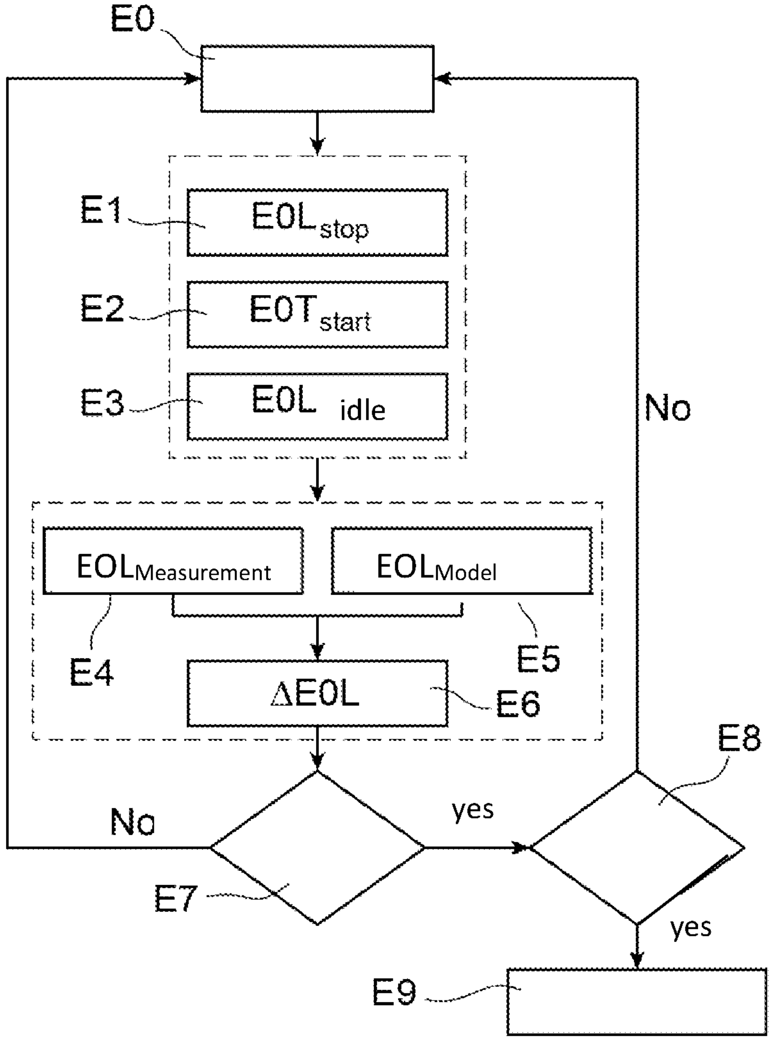
FIG. 2 illustrates a method for monitoring the anti-leak valve of the circuit for supplying the lubrication system, according to one embodiment of the invention.

FIG. 2 represents one embodiment of the method for monitoring the anti-leak valve 110 of the oil supply circuit 11 of the jet engine. This method comprises steps E0 to E9 implemented by the monitoring circuit 6 during starting of the jet engine.

Step E0 is a standby step, wherein the jet engine is stopped. The next steps E1 to E9 are taken when starting of the jet engine is initiated.

During starting of the jet engine in the absence of leakage of the anti-leak valve 110 of the oil supply circuit 11, the change in the amount of oil present in the assembly 2 of components of the jet engine to be lubricated is a reproducible phenomenon where only the oil temperature variability from one flight to another leads to a slight dispersion.

In the event of leakage of the anti-leak valve 110 of the oil supply circuit 11, oil flows between the reservoir and the accessory gearbox when the jet engine is stopped. This causes an abnormally high amount of oil in the assembly 2 of components of the jet engine to be lubricated just before starting and at the beginning of starting. In this case, during starting of the jet engine, the change in the amount of oil present in the assembly 2 of components of the jet engine to be lubricated will therefore be different from the change usually encountered.

Step E1 is a command to measure the oil level $EOL_{stop}$ in the reservoir 10 at the beginning of starting the jet engine. The oil level in the reservoir 10 is measured by the sensor 5. The overall amount of oil in the jet engine is substantially equal to the sum of the amount of oil present in the reservoir 10 and of the amount of oil present in the assembly 2 of components of the jet engine to be lubricated. The measurement of the oil level in the reservoir 10 is therefore an indicator of the amount of oil present in the assembly 2 of components of the jet engine to be lubricated.

Starting of the jet engine is identified by the speed N2 of the high pressure shaft of the jet engine. Indeed, during starting of the jet engine, the speed N2 of the high pressure shaft of the jet engine varies between zero at the beginning of starting and a speed characteristic of an idle power, at the end of starting. The speed characteristic of an idle power is for example equal to 70% of the maximum power of the jet engine.

The speed N2 of the high pressure shaft is measured by the sensor 4.

The beginning of starting the jet engine is identified by the speed N2 of the high pressure shaft of the jet engine that is zero.

The result of step E1 is the measured value $EOL_{stop}$ of oil level in the reservoir 10 at the beginning of starting the jet engine.

The next step E2 is a command to measure the oil temperature performed by the oil temperature sensor 3.

The result of step E2 is a temperature measured value $EOT_{start}$ during starting of the jet engine.

The next step E3 is a command to measure the oil level $EOL_{idle}$ in the reservoir 10 at the end of starting the jet engine. There again, the oil level in the reservoir is measured by the sensor 5 and is characteristic of the amount of oil present in the assembly 2 of components of the jet engine to be lubricated.

The end of starting the jet engine is identified by the N2 of the high pressure shaft of the jet engine, which is equal to the idling speed of the jet engine.

The result of step E3 is the measured value $EOL_{idle}$ of oil level in the reservoir 10 at the end of starting the jet engine.

Alternatively, the instants of measurements during starting are different and determined by other speed values N2 of the high pressure shaft of the jet engine.

Figure 3:
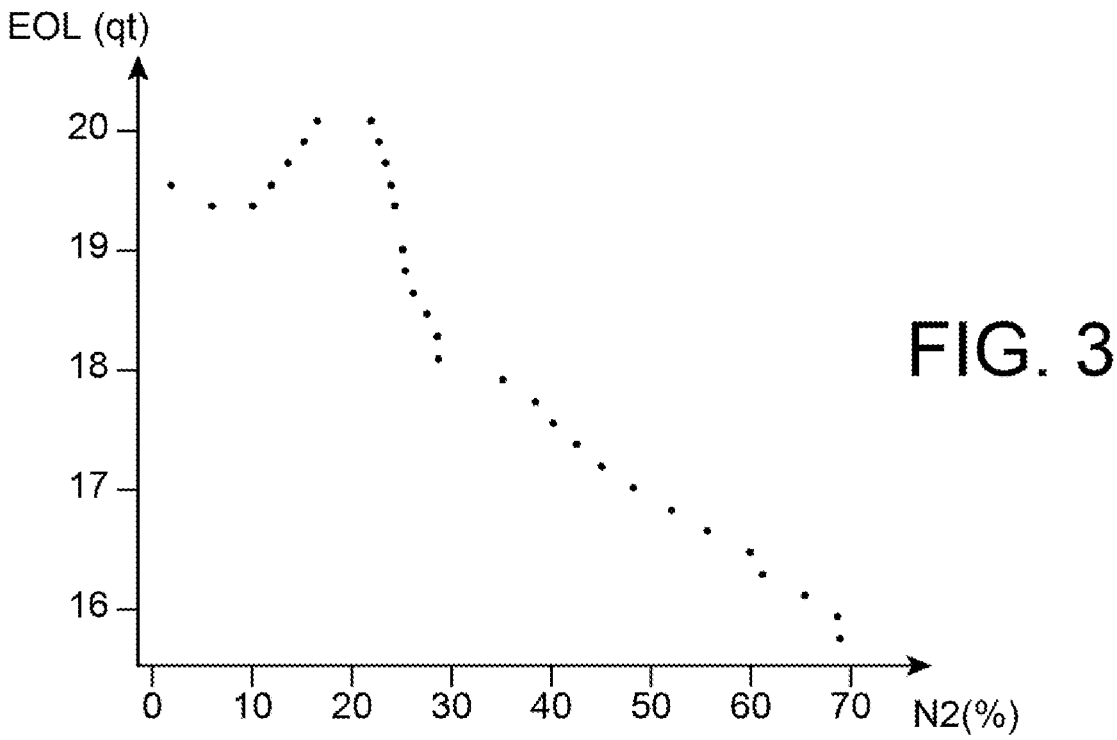
FIG. 3 illustrates the change in the oil level in the reservoir during starting of the jet engine.

FIG. 3 represents the change in the oil level EOL in the reservoir 10 during starting of the jet engine, that is to say from the beginning until the end of starting, depending on the speed N2 of the high pressure shaft of the jet engine. FIG. 3 represents a case of nominal operation, when the anti-leak valve 110 operates normally.

The speed N2 of the high pressure shaft of the jet engine varies between a zero speed and an idling speed, and is expressed in percentage of the maximum power of the jet engine.

In the event of leakage of the anti-leak valve 110, it is reminded that there is an overflow of oil in the assembly 2 of components of the jet engine to be lubricated and consequently an abnormal distribution of the oil in the jet engine, at the beginning of starting. At the end of starting, the behaviour will be stabilised since the recovery pumps of the oil recovery circuit will have recovered all or part of the oil initially stored in the assembly 2 of components of the jet engine to be lubricated.

The next step E4 is a calculation of an indicator equal to the difference of the measured value $EOL_{stop}$ of oil level in the reservoir at the beginning of starting the jet engine and of the measured value $EOL_{idle}$ of oil level in the reservoir at the end of starting the jet engine:

$$EOL_{Measurement} = EOL_{stop} - EOL_{idle} \quad \text{(E1)}$$

This indicator forms a measured change in the oil level in the reservoir. Its purpose is to detect any abnormal behaviour of the anti-leak valve 110 during starting, based on the variation of the oil level in the reservoir between the beginning of starting (zero engine power) and the end of starting (engine idling reached).

The result of step E4 is therefore the value of the indicator $EOL_{Measurement}$.

At the same time as step E4, or after step E4, step E5 is a calculation of an estimated change of oil level in the reservoir 10 depending on the oil temperature upon starting the jet engine. The oil temperature is measured by the sensor 3.

The inventors noted that the dispersion observed on the oil level in the reservoir upon starting the jet engine is primarily related to the oil temperature. To improve the accuracy of the indicator above, the oil temperature is taken into account to improve accuracy.

Figure 4:
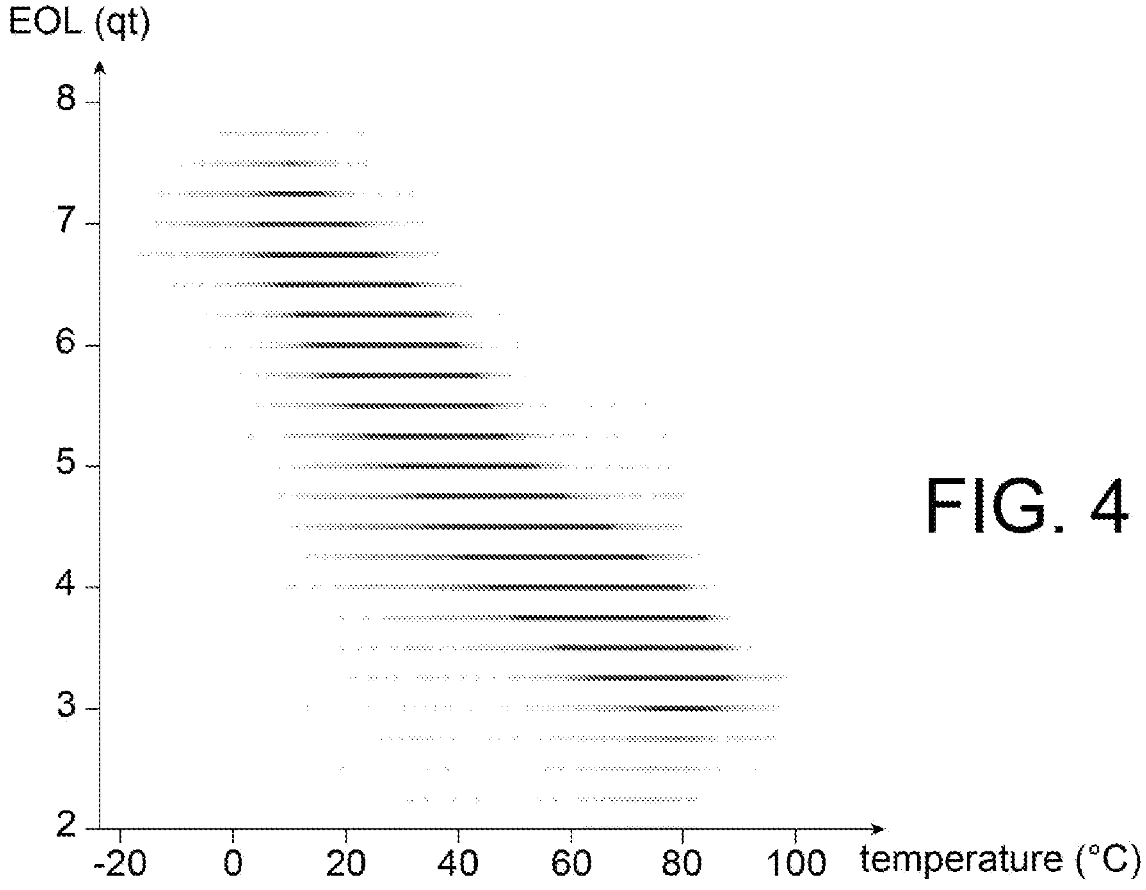
FIG. 4 illustrates the oil level in the reservoir during starting of the jet engine depending on the oil temperature.

FIG. 4 represents the oil level EOL in the reservoir 10 during starting of the jet engine depending on the oil temperature.

There is a significant correlation between the amplitude of the oil level in the reservoir upon starting the jet engine and the oil temperature upon starting.

Thus, it is possible to model the oil temperature variations upon starting by creating a model of the oil level in the reservoir upon starting the jet engine in the form:

$$EOL_{Model} = a \times EOT_{start} + b \quad \text{(E2)}$$

Where $EOT_{start}$ represents the oil temperature upon starting the jet engine and a and b are constants.

The result of step E5 is therefore the estimated value $EOL_{Model}$ of oil level in the reservoir 10 for the oil temperature $EOT_{start}$ measured on starting the jet engine.

Steps E4 and E5 are followed by step E6 at which is calculated the difference ΔEOL between the value $EOL_{Measurement}$ calculated at step E4 and the value $EOL_{model}$ calculated at step E5:

$$\Delta EOL = EOL_{Mesure} - EOL_{Modèle} \quad \text{(E3)}$$

The difference ΔEOL is an indicator wherein the influence of the temperature is eliminated.

The result of step E6 is therefore the value of the indicator ΔEOL.

Figure 5:
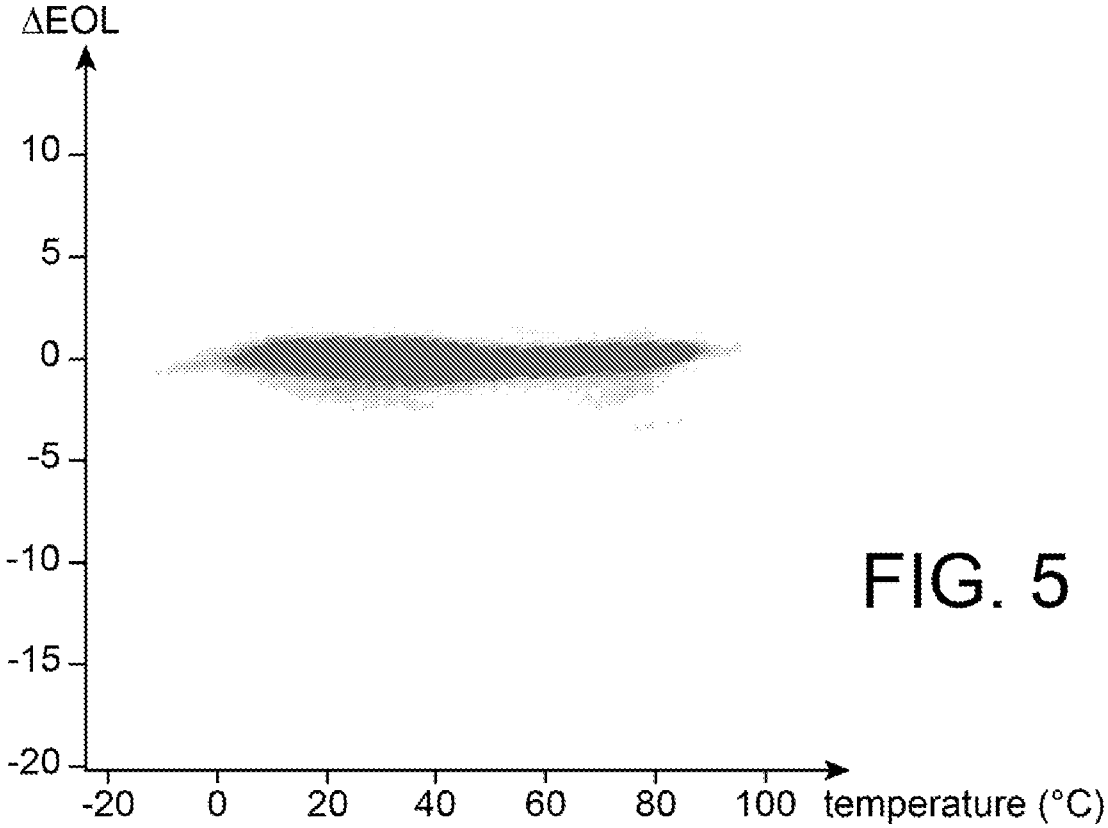
FIG. 5 illustrates an indicator formed according to the invention, depending on the oil temperature.

FIG. 5 represents the difference ΔEOL depending on the oil temperature over a series of measurements carried out with a given jet engine. By comparing FIG. 5 with FIG. 4, it is noted that this indicator is centred on zero, regardless of the temperature within an operating range.

Figure 6:
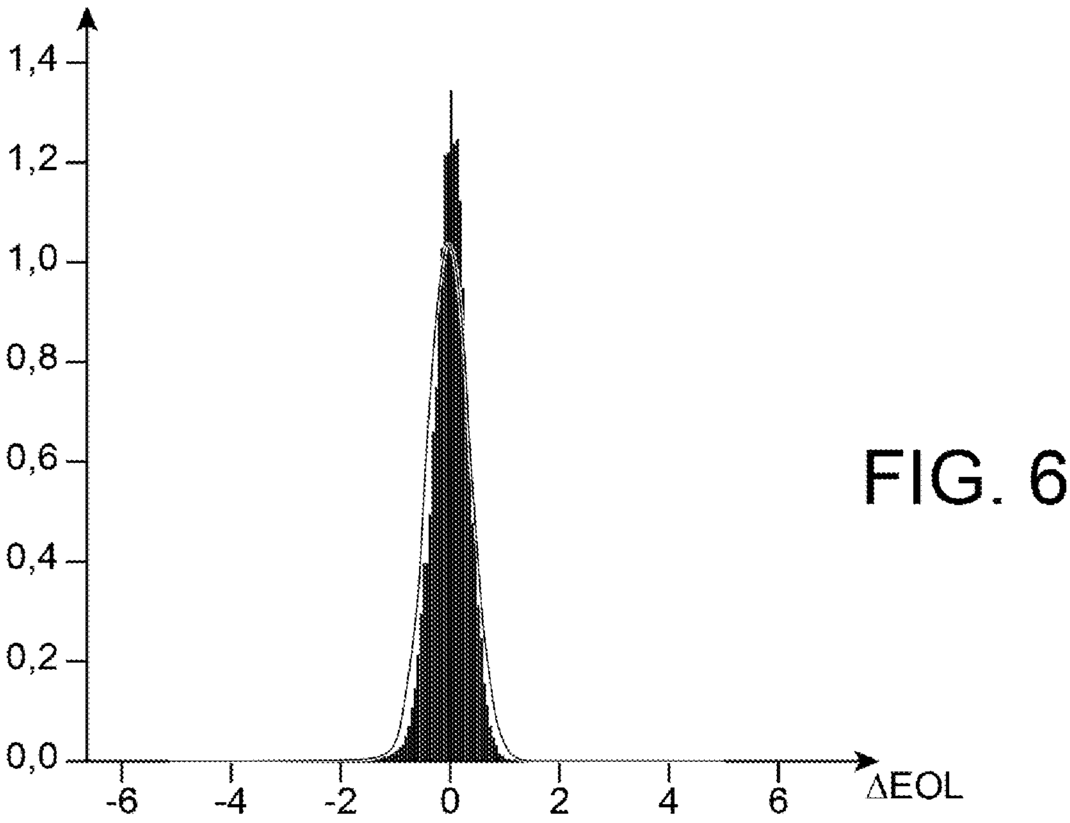
FIG. 6 illustrates the distribution of the indicator represented in FIG. 5.

FIG. 6 represents the distribution of the indicator ΔEOL over the series of measurements carried out with a given jet engine. This distribution may be approximated by a gaussian that is not very dispersed.

The next step E7 is a detection for determining whether the oil level in the reservoir is normal or not, that is to say if the anti-leak valve operates normally or not.

Figure 7:
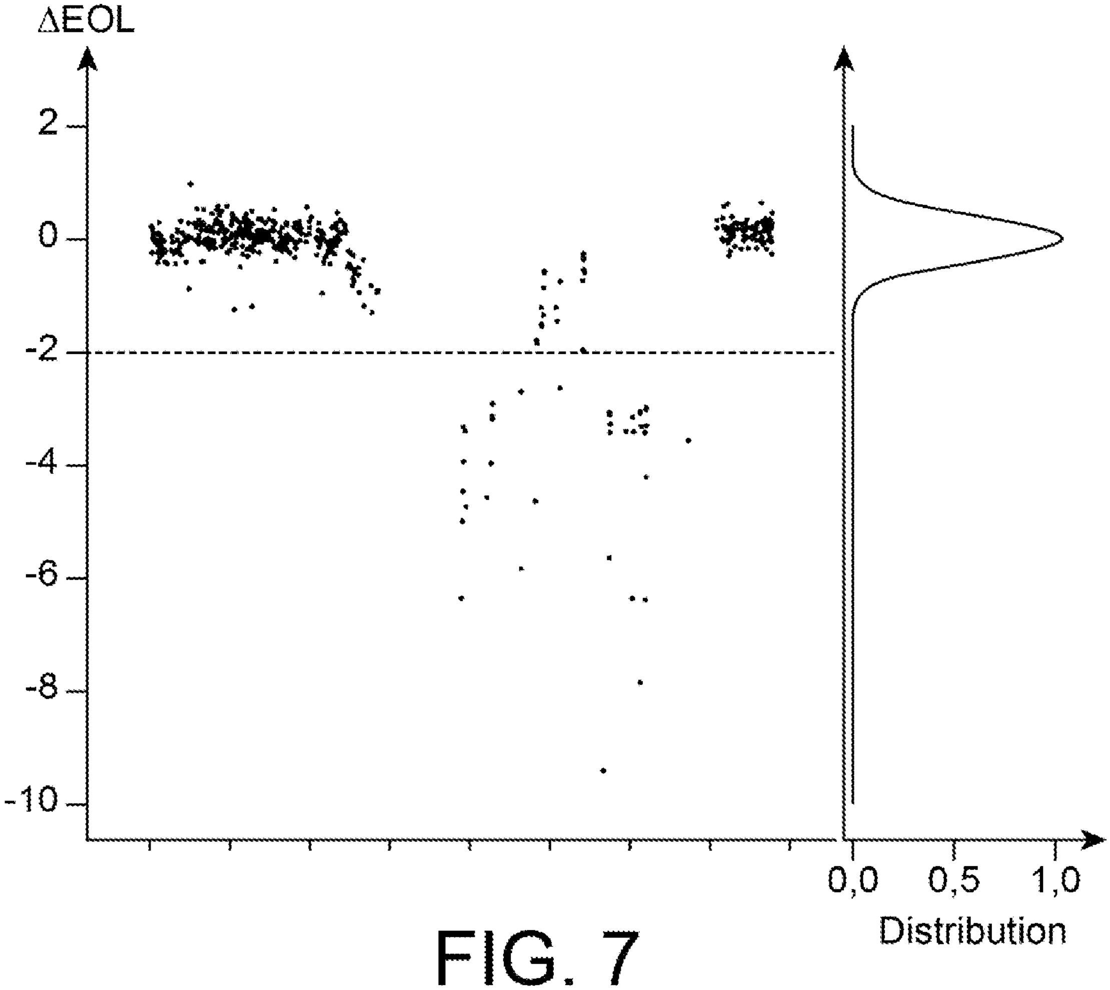
FIG. 7 illustrates indicators determined for jet engine startings and the distribution of these indicators.

For this, the value of the indicator ΔEOL determined at the previous step is compared with a detection threshold, for example equal to −2 as represented in FIG. 7. The result of the comparison is stored.

On the left side of FIG. 7, each point above the detection threshold is an indicator value ΔEOL corresponding to starting of the jet engine carried out with a healthy anti-leak valve, whereas each point below the detection threshold is an indicator value ΔEOL corresponding to starting of the jet carried out with a faulty anti-leak valve. The right-hand side of the figure represents the distribution of various points of the left-hand side of the figure.

If the value of the indicator ΔEOL is higher than the detection threshold, then the oil level is normal and step E7 is followed by step E0 already described.

If on the contrary the value of the indicator ΔEOL is lower than the detection threshold, then the oil level is abnormal and step E7 is followed by step E8, which is a test for determining whether N, where N is a predetermined first number, for example equal to three, of detections of abnormal oil level, of the M, where M is a second predetermined number higher than N and for example equal to five, recent startings of the jet engine have been detected.

If the response is negative, then step E8 is followed by step E0 already described.

If on the contrary the response is positive, this means that the detection of abnormal oil level is a recurrent phenomenon. Step E8 is then followed by step E9 at which an alarm is triggered. The alarm is for example a message intended for a maintenance operator of the jet engine.

What is claimed is:

1. Method for monitoring an anti-leak valve of a circuit for supplying oil between an oil reservoir and elements to be lubricated of a jet engine, characterised in that it comprises steps of:

Measuring oil level values in the reservoir, respectively at the beginning and at the end of starting the jet engine, Calculating the difference between the oil level values in the reservoir at the beginning and at the end of starting the jet engine, to form a measured change in the oil level in the reservoir, Measuring an oil temperature value, Determining an estimated change of the oil level in the reservoir, depending on the oil temperature value, Calculating the difference between the measured change in the oil level in the reservoir and the estimated change in the oil level in the reservoir for the measured temperature value, Comparing the calculated difference with a detection threshold, Activating an alarm if the calculated difference is lower than the detection threshold.

2. Method for monitoring an anti-leak valve according to claim 1, wherein the beginning and the end of starting the jet engine are detected on the basis of a speed measurement of a high pressure shaft of the jet engine.

3. Method for monitoring an anti-leak valve according to claim 1, wherein the alarm is activated if the result of the comparison is lower than the detection threshold for a first predetermined number (N) of startings of the jet engine from a second predetermined number (M) of recent startings of the jet engine, higher than the first predetermined number.

4. Device for monitoring an anti-leak valve of a circuit for supplying oil between an oil reservoir and elements to be lubricated of a jet engine, characterised in that it comprises:

A sensor capable of measuring oil level values in the reservoir (10), respectively at the beginning and at the end of starting the jet engine, A sensor capable of measuring an oil temperature value, A calculator capable of calculating the difference between the oil level values in the reservoir at the beginning and at the end of starting the jet engine, to form a measured change in the oil level in the reservoir, determining an estimated change of the oil level in the reservoir depending on the oil temperature value, calculating the difference between the measured change in the oil level in the reservoir and the estimated change of the oil level in the reservoir for the measured temperature value, comparing the difference calculated with a detection threshold, and activating an alarm if the calculated difference is lower than the detection threshold.

5. Jet engine equipped with a device for monitoring an anti-leak valve of a circuit for supplying oil between an oil reservoir and elements to be lubricated of the jet engine, according to claim 4.

6. Aircraft equipped with a jet engine according to claim 5.

7. Non-transitory computer-readable medium having instructions thereon that, when executed by a computer, cause the computer to execute steps of the method according to claim 1.

* * * * *